United States Patent [19]

Sakamoto

[11] 4,115,800
[45] Sep. 19, 1978

[54] COLOR VIDEO SIGNAL RECORDING AND/OR REPRODUCING APPARATUS

[75] Inventor: Hitoshi Sakamoto, Zama, Japan

[73] Assignee: Sony Corporation, Tokyo, Japan

[21] Appl. No.: 841,982

[22] Filed: Oct. 13, 1977

Related U.S. Application Data

[63] Continuation of Ser. No. 777,551, Mar. 14, 1977, abandoned.

[51] Int. Cl.² .................................................. H04N 5/78
[52] U.S. Cl. ........................................................ 358/8
[58] Field of Search ........................................ 358/4, 8

[56] References Cited

U.S. PATENT DOCUMENTS 3,953,881  4/1976  Yanagimachi et al. ................. 358/4

FOREIGN PATENT DOCUMENTS 1,300,402  12/1972  United Kingdom.

*Primary Examiner*—Robert L. Richardson
*Attorney, Agent, or Firm*—Lewis H. Eslinger; Alvin Sinderbrand

[57] ABSTRACT

Color video signal recording and/or reproducing apparatus comprising a first circuit for generating a first signal having the same frequency as the field frequency of the color video signal, and a second circuit for generating a second signal that indicates a field interval having a predetermined phase relationship between a horizontal synchronizing signal and a color subcarrier signal. The first and second signals are combined to form a composite control signal, which is then recorded in a control track on a magnetic tape in the conventional manner. A comparison circuit is included for comparing the composite control signal reproduced from the tape with a reference control signal, the reference control signal being composed of a third signal having a frequency equal to the field frequency and a fourth signal indicating a field interval, in which a phase relationship between a reference horizontal synchronizing signal and a reference color subcarrier signal is equal to the predetermined phase relationship. Thus, during playback the movement of the magnetic tape is controlled in response to the output of the comparison circuit so that the phase of the composite control signal reproduced from the tape coincides with that of the reference control signal.

7 Claims, 6 Drawing Figures

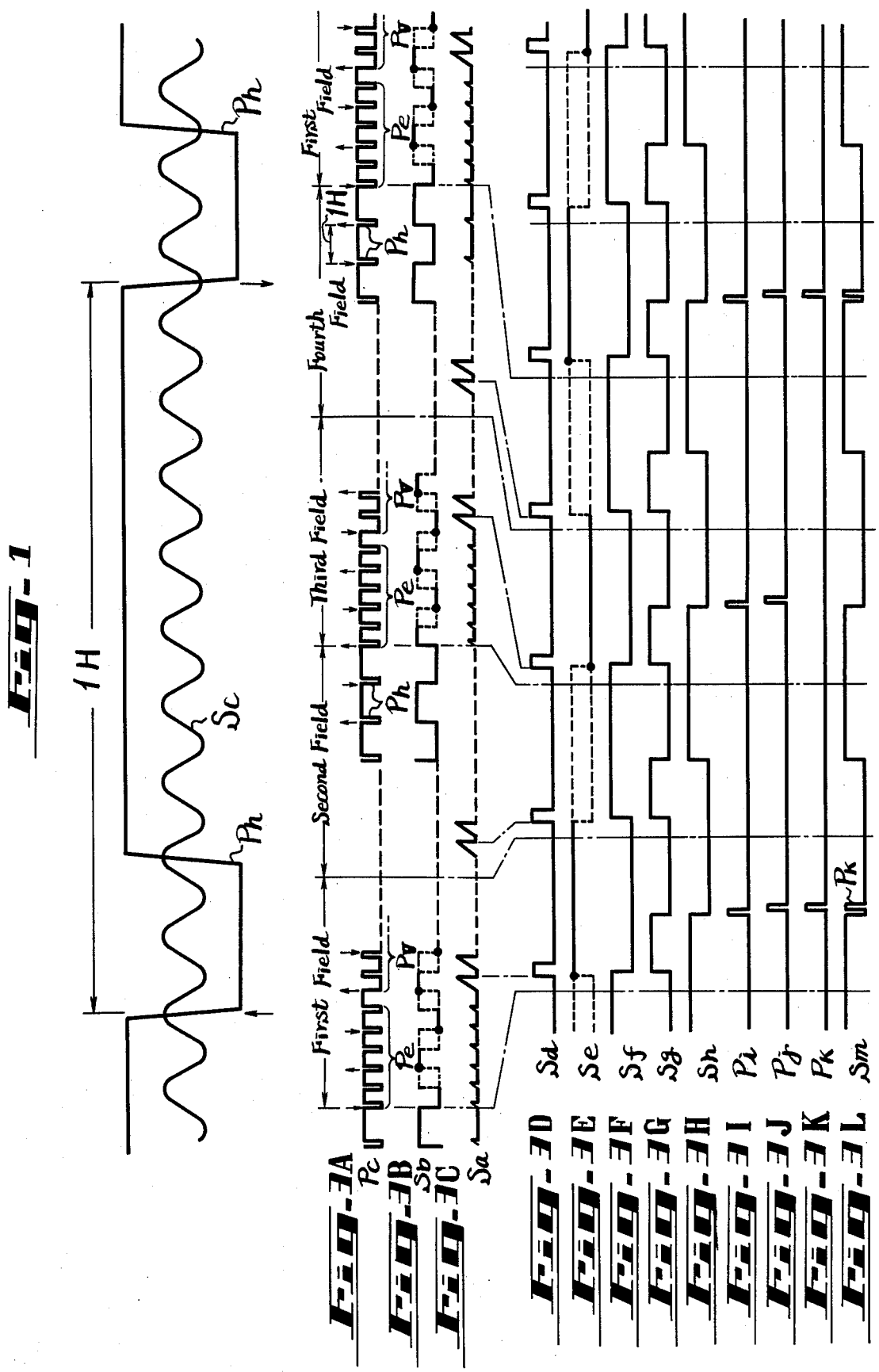

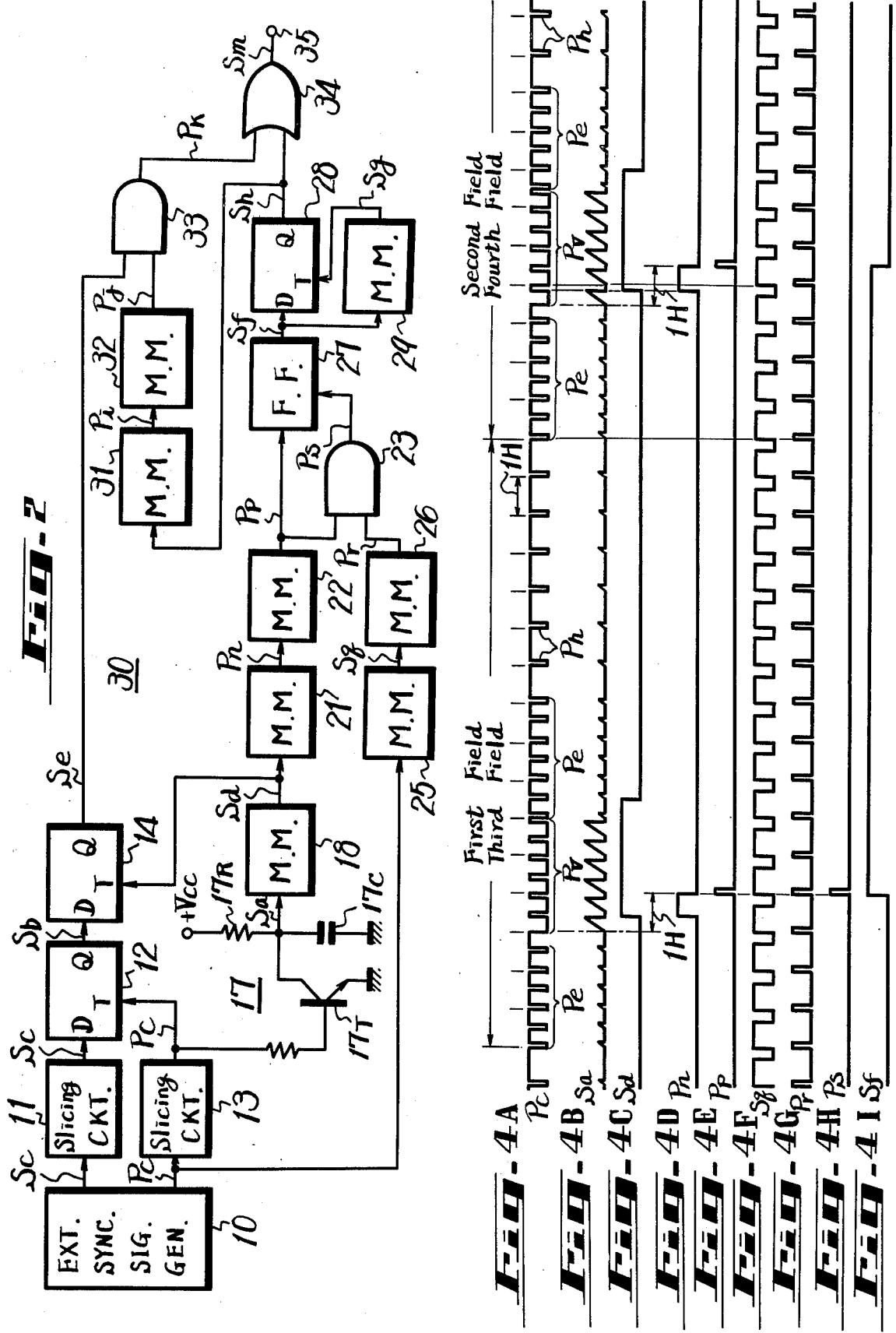

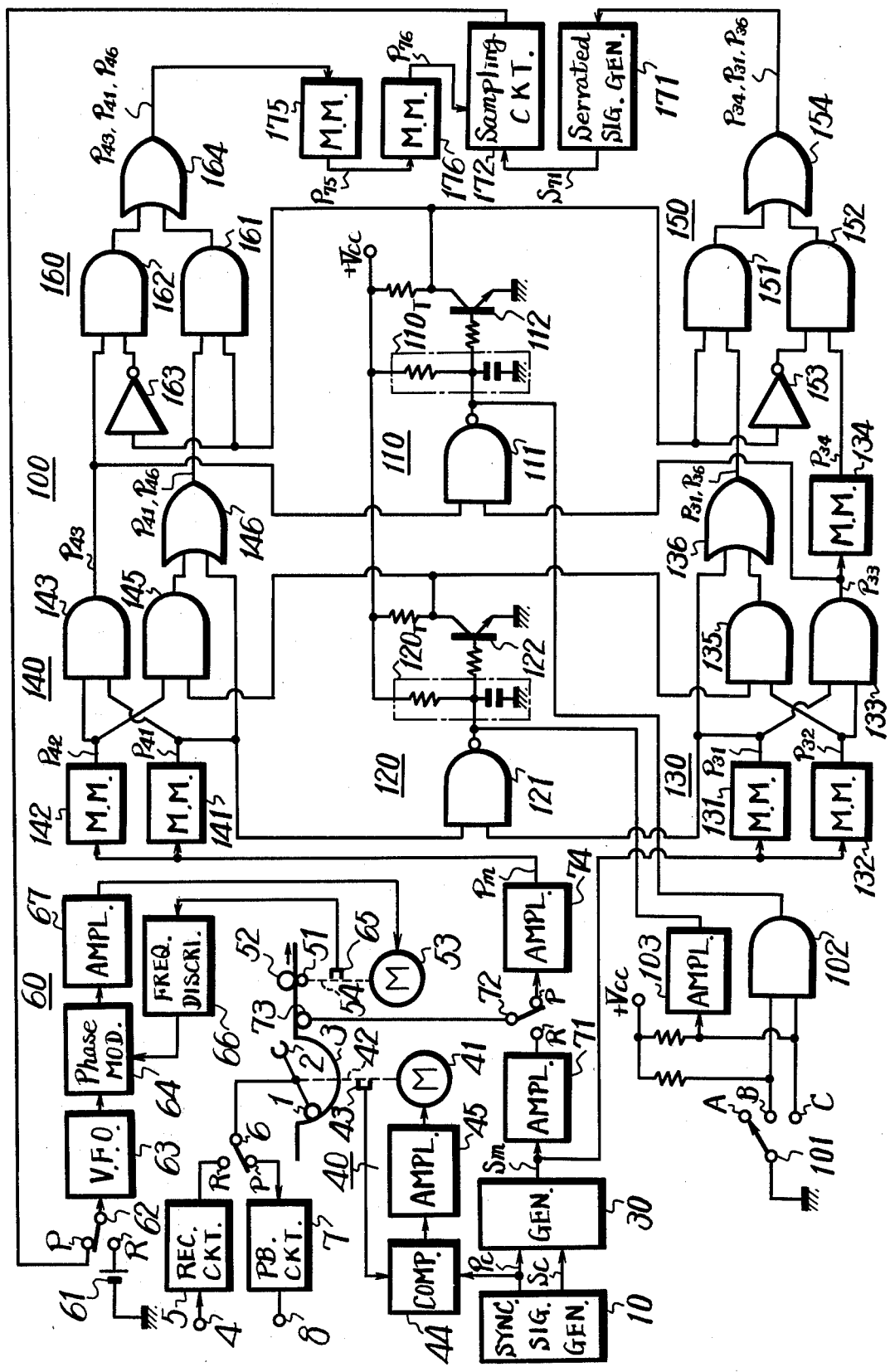

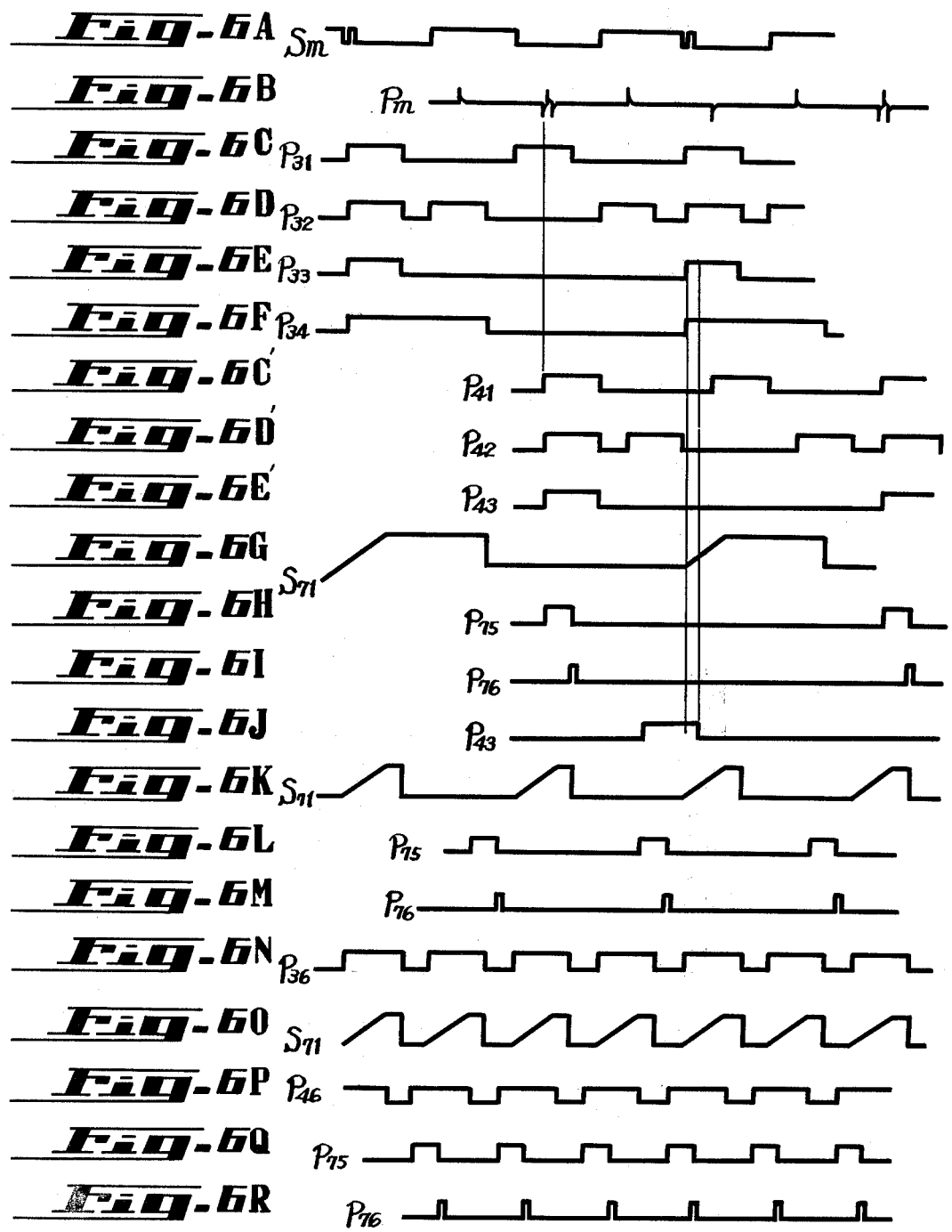

COLOR VIDEO SIGNAL RECORDING AND/OR REPRODUCING APPARATUS

This is a continuation of application Ser. No. 777,551 filed Mar. 14, 1977, now abandoned.

BACKGROUND OF THE INVENTION

1. Field of the Invention

This invention relates to a color video signal recording and/or reproducing apparatus and, more particularly, to apparatus for providing precise color frame lock of color television signals, even if magnetic tape on which the color television signals, like the NTSC signal, has been recorded is spliced electrically or physically.

2 Description of the Prior Art

As is well known, in the NTSC color television signal, there is an exact frequency relationship between the horizontal synchronizing frequency $f_h$ and the color subcarrier frequency $f_{sc}$, namely $f_{sc} = 455/2 f_h$, and consequently four television fields must occur before the color subcarrier signal exactly repeats itself in phase with respect to the horizontal synchronizing signal. In other words, the periodicity of the color frame is four fields. Assuming that the color subcarrier signal has its positive peak value at the front edge of the horizontal synchronizing signal, the color subcarrier signal has its negative peak value at the front edge of the next horizontal synchronizing signal. This means that the phase of the subcarrier signal is reversed at every horizontal interval. As a result of the reversal, if the subcarrier has its negative peak value at the front edge of the first equalizing pulse included in the first field of a first frame, the positive peak value of the subcarrier signal occurs at the front edge of the first equalizing pulse included in the first field of the next frame, which immediately succeeds the first frame. In that sense, these two frames are different. It will be evident that if a continuous signal is to be reproduced, splices must join successive frames in the correct sequence; i.e., the first frame must be joined to the second frame. If the first frame is joined to another frame having the same phase relationship between the color subcarrier and the first equalizing pulse as the first frame so as to constitute another "first" frame, there will be a sudden 180° phase shift in the burst or color subcarrier signals at the splicing point.

In the conventional color television receiver, the color subcarrier signal used for synchronous detection is formed on the basis of the burst signals. The subcarrier signal forming circuit has a fly-wheel effect to some extent, so that even if the phase of the burst signal is suddenly reversed, the phase of the subcarrier signal cannot follow the sudden change of the phase of the burst signal. As a result, there will be some phase differences between the chrominance signal and the color subcarrier signal, and hence there will be a transient disturbance of the hue of a reproduced picture.

This is an obviously unacceptable condition, and the normal VTR is provided with means for recognizing the improper phase and shifting the phase of the whole television signal by half a cycle of the subcarrier signal to bring it back into the proper phase. In order to perform the above operation, the VTR has a delay line, to which the color television signal is applied. The burst signal is separated from the composite signal and then the phase of the burst signal is compared in a comparator with the phase of a reference subcarrier signal. If the phase of the color subcarrier signal is reversed at the editing point, an error voltage will be obtained from the comparator. The error voltage is supplied to the delay line to shift the timing of the whole signal, and this the latter will be moved 180° (140 nano seconds) ahead or behind the proper timing position. In other words, the phase correction places the color subcarrier signal in proper phase, but it introduces a 140 nano second error in the horizontal timing. Thus, the insertion or removal of 140 nsec. of delay at the editing point causes the picture on the screen to jump sideways.

In order to avoid the above-described disadvantage, several approaches and methods have been proposed. One method is to use the 15Hz frame pulses instead of the 30Hz pulses used on the control track. This refers to the use of frame pulses at one-fourth the basic field repetition rate of NTSC signals. This means that a servo operation is performed once every four fields. Accordingly, the lock-up time of the servo operation will be increased by approximately 20 percent in comparison with the 30Hz servo operation. Also, it is difficult to splice the tape at the exact field or frame.

Another method is to use a servo control circuit in which, if the error voltage from the burst phase comparator indicates lock-up to the wrong frame, an electrical signal is generated which causes the tape drive motor momentarily to speed up so as to move the magnetic tape ahead by a distance corresponding to approximately one frame. However, in this method, the servo circuit must be unlocked once the error voltage is detected, and thereafter the servo circuit must be operated to lock in the new frame again. This means that the total lock-up time of the VTR is greatly increased, as in the above-described method.

SUMMARY OF THE INVENTION

A principal object of this invention is to provide an improved color video signal recording and/or reproducing apparatus which can lock onto the proper color frame in a short time.

In accordance with the invention, the color video signal recording and/or reproducing apparatus comprises a circuit for generating a first signal having a frequency equal to the field frequency of the color video signal and a circuit for generating a second signal which indicates a field interval having a predetermined phase relationship between a horizontal synchronizing signal and a color subcarrier signal. In an NTSC signal, the second signal is generated every four fields. The first and second signals thus obtained are synthesized to form a composite control signal, and the latter is recorded on a control track of a magnetic tape in the conventional manner. The apparatus further comprises a circuit for comparing the composite control signal reproduced from the tape with a reference control signal. The reference control signal is composed of a third signal having a frequency equal to the field frequency and a fourth signal indicating a field interval, in which the phase relationship between a reference horizontal synchronizing signal and a reference color subcarrier signal is equal to the predetermined phase relationship. Thus, during playback, movement of the magnetic tape is controlled in reaponse to the output of the comparing circuit so that the phase of the composite control signal reproduced from the tape coincides with that of the reference control signal.

Other objects, features and advantages of the invention will become apparent, and its construction and operation better understood, from the following detailed description taken in conjunction with the accompanying drawings.

BRIEF DESCRIPTION OF THE DRAWINGS

FIG. 1 shows waveforms representing the horizontal synchronizing signal and the color subcarrier signal.

FIG. 2 is a block diagram of a field discriminating signal generator which is used in the system of this invention.

FIGS. 3 and 4 are timing waveforms which are used for explaining the operation of the generator of FIG. 2.

FIG. 5 is a schematic block diagram of the video signal processing apparatus of this invention.

FIG. 6 is a timing waveform which is used for explaining the operation of the apparatus of FIG. 5.

DESCRIPTION OF THE PREFERRED EMBODIMENT

FIG. 1 shows two horizontal synchronizing pulses $P_h$ and a wave representing the color subcarrier signal $S_c$. By definition, the leading edges of the horizontal synchronizing pulses $P_h$ are spaced apart by one horizontal line interval. In accordance with NTSC standards, the frequency of the color subcarrier signal $S_c$ is an odd multiple of one-half the repetition rate of the horizontal pulses, and although the nultiple is actually 455, the wave $S_c$ in FIG. 1 is shown as having a multiple much lower than 455 so that the phase relationship between the signals $P_h$ and $S_c$ can be clearly seen.

At the leading (negative-going) edge of the first horizontal synchronizing pulse $P_h$, the signal $S_c$ is at a positive peak. Because of the odd nultiple of one-half the horizontal rate, the signal $S_c$ is at a negative peak at the leading edge of the second horizontal synchronizing pulse $P_h$. This alternating phase, or polarity, reversal causes the phase relationship at every odd-numbered horizontal synchronizing pulse $P_h$ to be as shown at the left-hand pulse $P_h$ in FIG. 1 and the phase relationship at every even-numbered pulse $P_h$ to be as shown at the right-hand pulse $P_h$ in the figure. Thus, the phase relationship at the left-hand pulse $P_h$ can be considered to be the relationship that exists at the first line of a frame and at the 525th line, which is the last line, of the same frame, while the relationship at the right-hand pulse $P_h$ can be considered to be the relationship that exists at the second line of the same frame and at the first line of the next frame, which illustrates the reversal in phase relationship between a horizontal line of one frame and the corresponding line of the next frame.

FIG. 2 shows a field discriminating signal generator 30 in which an external synchronizing signal generator 10 produces a color subcarrier signal $S_c$ shown in FIG. 1 and a composite synchronizing signal $P_c$, which is shown in FIG. 3A. The color subcarrier signal $S_c$ is fed to a slicing circuit 11 to be shaped into a rectangular signal which is then fed to the D-input terminal of a D-type flip-flop circuit 12. The composite synchronizing signal $P_c$ from the generator 10 is applied to a slicing circuit 13 to be shaped further into the form of the signal $P_c$ shown in FIG. 3A and then applied to the T-input terminal of the flip-flop circuit 12. The flip-flop circuit 12 is triggered by the down-going edges of the synchronizing signal $P_c$ and hence produces at its Q terminal a rectangular waveform signal $S_b$, the level of which is varied to take on either of the logic values "0" or "1" in response to the levels of the subcarrier signal $S_c$ at the down-going edges of the horizontal synchronizing signal $P_h$ in the signal $P_c$, as shown in FIG. 3B.

However, it should be noted in FIG. 3B that, during the vertical synchronizing interval, the signal $S_b$ cannot be alternatively changed at every horizontal interval. The reason is that the flip-flop circuit 12 is triggered by equalizing pulses $P_e$ (refer to FIG. 3A). The equalizing pulses $P_e$ spaced at intervals of one horizontal line following the last horizontal synchronizing pulse $P_h$ in the preceding field are equivalent to the horizontal synchronizing pulse $P_h$, so that the signal $S_b$ is made "0" or "1", alternatively in response to the levels of the subcarrier signal $S_c$ when triggering occurs at those pulses $P_e$ (refer to the arrows in FIG. 3A), as shown in FIG. 3B by the solid line. On the other hand, triggering also takes place at those equalizing pulses $P_e$ midway between the aforementioned equalizing pulses. These in-between equalizing pulses $P_e$ are positioned at odd multiples of 0.5H, where H is the horizontal line interval, with respect to the pulse $P_h$, so that the value of subcarrier signal $S_c$ that happens to exist when triggering occurs at the in-between equalizing pulses $P_e$ also controls the level of the signal $S_b$. The value of the signal $S_c$ midway between horizontal synchronizing pulses thus is approximately midway between its positive and negative peak values. As a result, the level of the signal $S_b$ is ambiguous during the equalizing interval, it may be either "0" or "1" from the half-H pulse $P_e$ to the next pulse $P_e$, as shown in FIG. 3B by the dotted lines.

Further, it is to be noted that the level of the signal $S_b$ is opposite at the beginning of the first and third fields. The output signal $S_b$ from the flip-flop circuit 12 is fed to a D-terminal of a D-flip-flop circuit 14 to determine whether the output of the flip-flop is to have a "0" or a "1" level for the next field. This flip-flop is triggered by the going-up edges of the signal $S_d$ supplied to a T-terminal thereof, and, as indicated in FIG. 3E, its output may also be ambiguous, or indeterminate, because the level of signal $S_b$ may be ambiguous at the time of the leading edge of the pulses $S_d$.

On the other hand, the composite synchronizing signal $P_c$ from the slicing circuit 13 is also supplied to a serrated-signal forming circuit 17, in which a capacitor 17C is charged through a resistor 17R from a voltage supply source $+V_{CC}$ during the time the level of the signal $P_c$ is "0", that is, when a transistor 17T is non-conductive. As a result of the charging of the capacitor 17C, a serrated-signal $S_a$ as shown in FIG. 3C is generated in the circuit 17. It is of importance that the serrated signal $S_a$ has a larger amplitude during the vertical synchronizing interval than during any other interval. The serrated signal $S_a$ is supplied to a mono-stable multivibrator 18, which is triggered by the negative-going edge of the first serrated signal $S_a$ in the vertical synchronizing interval, and which generates a rectangular signal $S_d$ having a pulse width greater than the vertical synchronizing interval, as shown in FIG. 3D and in FIG. 4C. The rectangular signal $S_d$ is supplied to the T-terminal fo the flip-flop circuit 14 as set forth above.

As previously described, the signal $S_b$ is supplied to the D-terminal of the flip-flop circuit 14, so that the flip-flop 14 produces at its Q-terminal a signal $S_e$ as shown in FIG. 3E. The signal $S_e$ is produced having the value "1" if the level of the signal $S_b$ is "1" at the positive-going edge of the signal $S_d$ in the first field. In that case, the level of the signal $S_b$ will be "0" at the positive-going edge of the signal $S_d$ in the third field, thereby causing the level of the signal $S_e$ to be "0" during the third field. Further, in the second and fourth fields the levels of the signal $S_b$ are ambiguous at the positive-going edges of the signal $S_d$, so that the level of the signal $S_e$ also becomes ambiguous during the second and fourth fields.

The signal $S_d$ from the mono-stable multivibrator 18 is also supplied to a mono-stable multivibrator 21 which is triggered by the positive-going edge of the signal $S_d$ and produces a pulse $P_n$ that rises up at the positive-going edge of the signal $S_d$ and then drops after an interval of about 1H duration from the starting point of the vertical synchronizing pulse $P_v$ as shown in FIG. 4D. The pulse $P_n$ is supplied to a mono-stable multivibrator 22 which is triggered by the negative-going edge of the pulse $P_n$ and produces a pulse $P_p$ of narrow width, which is substantially equal to the horizontal synchronizing pulse width, as shown in FIG. 4E. In this case, it is noted that the pulse $P_p$ is produced at every field and occurs at a time approximately 1H later than the starting point of the vertical synchronizing signal. The pulse $P_p$ thus obtained is supplied to one input terminal of an AND-circuit 23.

The composite synchronizing pulse $P_c$ from the generator 10 is also supplied to a mono-stable multivibrator 25, which is triggered by the going-down edge of the pulse $P_c$ and produces a rectangular waveform signal $S_q$ that has a pulse width of more than half-H duration, as shown in FIG. 4F. This signal $S_q$ is fed to a mono-stable multivibrator 26 which is triggered by the positive-going edge of the pulse $S_q$ and produces a pulse $P_r$ synchronized with the horizontal synchronizing pulse $P_h$. This pulse $P_r$ is fed to the other input terminal of the AND-circuit 23.

Applying the pulse signals $P_p$ and $P_r$ to the AND-circuit 23 causes the AND-circuit to produce a pulse signal $P_s$ shown in FIG. 4H at every odd field, i.e., the first and third fields. This is because the pulse $P_p$ is shifted from the horizontal synchronizing $P_h$ by 0.5H in the second and fourth fields. As a result, the existence of the pulse $P_s$ shows that the field is the first or the third field.

The pulse $P_p$ of the field period from the mon-stable multivibrator 22 is fed to a reset terminal of a flip-flop circuit 27 while the pulse $P_s$ from the AND-circuit 23 is supplied to a set terminal thereof. The flip-flop circuit 27 this produces a signal $S_f$ which is reversed at every pulse $P_p$. That is, the signal $S_f$ becomes "0" in the first and third fields and becomes "1" in the second and fourth fields as shown in FIG. 4I and FIG. 3F, respectively. The signal $S_f$ is supplied first to a D-terminal of a D-flip-flop circuit 28, which is triggered by the negative-going edges of a signal applied to its T-terminal, and second to a mono-stable multivibrator 29, which is triggered by both the positive-going and negative-going edges of the signal $S_f$ and produces a rectangular wave signal $S_g$ having a pulse width of approximately half-field duration as shown in FIG. 3G. This signal $S_g$ is applied to the flip-flop circuit 28 at its T-terminal as set forth above, so that the flip-flop circuit 28 produces at its Q-terminal a rectangular wave signal $S_h$ which is reversed at about the center of each field and has a high level in the first halves of the first and third fields and in the latter halves of the second and fourth fields as shown in FIG. 3H.

The signal $S_h$ is then fed to a mono-stable multivibrator 31 which is triggered by the negative-going edge of the signal $S_h$ and produces a pulse $P_i$ having a pulse width of about 3H as shown in FIG. 3I. This pulse $P_i$ is then fed to a mono-stable multivibrator 32 which is triggered by the negative-going edge of the pulse $P_i$ and produces a pulse $P_j$ having a pulse width of about 3H as shown in FIG. 3J. As is apparent from the above description, the pulse signal $P_j$ occurs after an interval of about 3H from the negative-going edge of the signal $S_h$.

The pulse $P_j$ is supplied to one input terminal of an AND-circuit 33, while the signal $S_e$ from the flip-flop 14 is the other imput terminal thereof. This causes the AND-circuit 33 to deliver the pulse $P_j$ only during the first field as in index pulse signal $P_k$ as shown in FIG. 3K. The pulse $P_k$ and the signal $S_h$ from the flip-flop circuit 28 are supplied to an OR-circuit 34, which then produces a rectangular wave signal $S_m$ which is reversed in level at every field and contains the pulse $P_k$ in the first field as shown in FIG. 3L. Thus, it is noted that this signal $S_m$ is varied with a four-field period and contains the index pulse $P_k$ in the first field. As will be described later, the pulse signal $S_m$, which is obtained from OR-circuit 34 and delivered to an output terminal 35, is used as a field discriminating signal in color framing.

The video signal processing apparatus according to this invention is to provide a color framing system using the field discriminating signal $S_m$. One embodiment of the apparatus will be explained hereinafter with reference to FIG. 5.

In FIG. 5, a pair of rotary magnetic heads 1 and 2 are spaced apart by an angular distance of 180° and are rotated by a motor 41 at a speed commensurate with the frame frequency. A magnetic tape 3 is guided obliquely along a cylindrical surface in contact with the path along which the heads 1 and 2 move. The heads are in contact with the tape over an angular range of about 180°, and the tape is transported lengthwise at a predetermined speed by a capstan 51 and pinch roller 52.

During recording, a color video signal, which is applied to a video input terminal 4, is processed by a recording circuit 5 in the conventional manner. The video signal thus obtained passes through a terminal R of a switch 6 to the magnetic heads 1 and 2 to be recorded along a slanted track on the magnetic tape 3. During playback, the color video signal reproduced from the magnetic tape 3 by means of the same heads 1 and 2 is supplied through a terminal P of the switch 6 to a reproducing circuit 7, from which the processed video signal is obtained and supplied to a video output terminal 8.

The video signal processing apparatus is provided with a drum servo circuit 40 for controlling the phase of the rotary magnetic heads 1 and 2. The circuit 40 includes a pulse generator 43 mounted on a rotary shaft 42 of the heads 1 and 2 to produce pulses that indicate the phase of the heads at every rotation of the heads. The pulses from the generator 43 and the composite synchronizing pulses $P_c$ fron the synchronizing signal generator 10 are supplied to a comparator 44, in which the phase, or timing of the pulses $P_c$ is compared with the timing of the vertical synchronizing signal $P_v$ in the pulse $P_c$. The output signal from the comparator 44 is fed through an amplifier 45 to the motor 41 to control the operation of the motor so as to synchronize the rotary phase of the heads 1 and 2 with the vertical synchronizing pulse $P_v$.

The video signal processing apparatus also includes a capstan servo circuit 60 for controlling the rotational speed of the capstan 51. This servo circuit includes a reference voltage source 61 producing a reference voltage. During recording, the reference voltage is supplied through terminal R of a switch 62 to control the operating frequency of a voltage-controlled, or variable-frequency, oscillator 63 to obtain a constant frequency signal. The constant frequency signal from the oscillator 63 is fed to a phase modulator circuit 64 as a carrier signal. A signal to modulate the phase of the carrier is generated by a circuit including a frequency generator 65 provided on a rotary shaft 54 of a motor 53 driving the capstan 51. The alternating voltage signal from the generator 65 is then fed to a frequency discriminator 66 to be converted to direct voltage, the magnitude of which is proportional to the rotating speed of the capstan 51. This direct voltage from the frequency discriminator 66 is supplied to the phase modulator 64 as a modulating input signal to modulate the phase of the carrier signal from the oscillator 63. The modulated signal from the modulator 64 is supplied through an amplifier 67 to the motor 53. Thus, the motor 53 is rotated at a constant speed determined by the reference voltage from the voltage supply source and hence the tape 3 is transported at a constant speed.

In FIG. 5, a generator circuit 30 produces the discriminating signal $S_m$, which was already described in connection with FIG. 2. During recording, the signal $S_m$ from the circuit 30 is supplied through an amplifier 71 and a terminal R of a switch 72 to a control head 73. Thus, the signal $S_m$ is recorded by the control head 73 on a longitudinal track formed along the edge of the tape. This means that on the tape 3 there is recorded the signal $S_m$ which indicates the phase of the color subcarrier signal relative to the horizontal synchronizing signal $P_h$.

During playback the field discriminating signal $S_m$ from the circuit 30 and the signal $P_m$ reproduced by the control head 73 and passed through an amplifier 74 are supplied to a phase detecting circuit 100 in which the phase of the signal $P_m$ is compared with the phase of the signal $S_m$ to produce a control voltage with which to synchronize the signal $P_m$ relative to the signal $S_m$ during the color framing operation. The control voltage from the circuit 100 is supplied through a terminal P of the switch 62 to the oscillator 63 to control the rotating speed of the capstan 51 in response to the control voltage in the above-described manner.

The phase detecting circuit 100 is provided with a framing switch 101, the movable arm of which is connected to a terminal A thereof during the color framing operation, to a terminal B during what is called VH framing operation, and to a terminal C during what is called field lock operation, respectively.

The reference field discriminating signal $S_m$ from the circuit 30 shown in FIG. 6A is supplied first to a mono-stable multivibrator 131 of a reference signal forming circuit 130 which is triggered by the negative-going edge of the signal $S_m$ to produce a pulse signal $P_{31}$ having a pulse width somewhat narrower than one field duration F. For example, the pulse may have a width of 0.8F as shown in FIG. 6C. The signal $S_m$ is also supplied to another mono-stable multivibrator 132, which is triggered by the positive-going edge of the signal $S_m$ to produce a pulse signal $P_{32}$ having the same pulse width as the pulse $P_{31}$, as shown in FIG. 6D, in which the phase of the signal $S_m$ is ahead by half a field. The pulses $P_{31}$ and $P_{32}$ are supplied to both input terminals of an AND-circuit 133, so that the AND-circuit 133 produces a pulse signal $P_{33}$ only during the first field as shown in FIG. 6E. The pulse signal $P_{33}$ is then fed to a mono-stable multivibrator 134 that produces a pulse signal $P_{34}$ with a positive-going leading edge at every positive-going edge of the pulse $P_{33}$ and having a width somewhat narrower than two fields, for example, 1.8 fields as shown in FIG. 6F. Thus, the pulse signal $P_{34}$ appearing once every four fields is used as a reference signal for color framing.

A differentiated pulse signal $P_m$ of the signal $S_m$ is shown in FIG. 6B and is reproduced by the control head 73 from the control track on the tape 3. The signal $P_m$ is then fed through a terminal P of the switch 72 and through the amplifier 74 to a comparison signal forming circuit 140 comprising two mono-stable multivibrators 141 and 142 that have the same time constants as the multivibrators 131 and 132, respectively. Consequently, pulse signals $P_{41}$ and $P_{42}$ generated by the multivibrators 141 and 142 correspond to the pulse signals $P_{31}$ and $P_{32}$, as shown in FIGS. 6C' and 6D', respectively. The pulse signals $P_{41}$ and $P_{42}$ are supplied to both input terminals of an AND-circuit 143, which then generates a pulse signal $P_{43}$ having the same pulse width as the pulse signal $P_{33}$ shown in FIG. 6E'.

As illustrated in FIGS. 6A to 6E', there is a phase difference between the pulse signal $S_m$ from the circuit 30 and the pulse signal $P_m$ from the head 73. Thus, there is a phase difference between the pulse signal $P_{33}$ and the pulse signal $P_{43}$.

During the color framing operation, the movable arm of the switch 101 is in contact with the terminal A thereof, so that the operating voltage $V_{CC}$ as a "1" signal to both input terminals of an AND-circuit 102. Accordingly, the AND-circuit 102 produces an output "1" signal which is then applied to a transistor 112. The pulse signals $P_{33}$ and $P_{43}$ from the AND-circuits 133 and 143 are supplied to both input terminals of a NAND-circuit 111, but the signals $P_{33}$ and $P_{43}$ are shifted in phase as shown in FIGS. 6E and 6E'. Thus, the NAND-circuit 111 produces a "1" output signal which is supplied to the transistor 112. Since both the output signals from the NAND-circuit 111 and the AND-circuit 102 are at the "1" level, the transistor 112 becomes conductive and its collector potential becomes "0". The "0" voltage of the transistor 112 is supplied to one input terminal of an AND-circuit 151 of a switching circuit 150 and to an inverter 153 that inverts the "0" signal to a "1" and applies the "1" signal to one input terminal of another AND-circuit 152 to enable the latter. As a result, the pulse signal $P_{34}$ (refer to FIG. 6F) from the multivibrator 134 is able to pass through the AND-circuit 152 and through an OR-circuit 154 to a serrated or trapezoidal wave signal generator circuit 171 that generates a serrated wave signal $S_{71}$ shown in FIG. 6G. This signal $S_{71}$ is supplied to a sampling circuit 172 as an input signal to be sampled.

The "0" signal from the collector of the transistor 112 is also supplied to one input terminal of an AND-circuit 161 and to an inverter 163 that inverts it to a "1" signal to be applied to one input terminal of an AND-circuit 162. This "1" signal enables the AND-circuit so that the pulse signal $P_{43}$ (refer to FIG. 6E') can pass through the AND-circuit 162 and through an OR-circuit 164 to a mono-stable multivibrator 175. The latter produces a pulse signal $P_{75}$ that goes positive at the positive-going edge of the pulse $P_{43}$, as shown in FIG. 6H.

The pulse $P_{75}$ is fed to a mono-stable multivibrator 176 that produces a pulse signal $P_{76}$ having a relatively narrow pulse width, as shown in FIG. 6I. This pulse signal $P_{76}$ is supplied to the sampling circuit 172 as a sampling pulse. Thus, the serrated wave signal $S_{71}$ from the serrated wave signal generator 171 is sampled in the sampling circuit 172 by the pulse signal $P_{76}$ from the multivibrator 176 to produce a direct voltage having a magnitude that corresponds to the phase difference between the signals $S_{71}$ and the pulse signal $P_{76}$, that is, to the phase difference between the signal $S_m$ from the circuit 30 and the pulse signal $P_m$ from the control head 73. The direct voltage from the sampling circuit 172 is supplied through the terminal P of the switch 62 to the variable frequency oscillator 63 as its control signal and, accordingly, the transporting speed of the tape 3 is controlled in response to the direct voltage.

As shown in FIG. 6, however, when the phase of the pulse signal $P_m$ in the reproducing system is different from the phase of the signal $S_m$ in the reference system to a great extent, the sampling pulse signal $P_{76}$ samples the low level portion of the serrated wave signal $S_{71}$. This means that since the reference direct voltage supplied to the capstan servo system 60 is low, the transporting speed of the tape 3 becomes lower than a predetermined speed. Accordingly, the phase of the reproduced pulse signal $P_m$ to the signal $S_m$ is delayed gradually, and hence the reproduced signal $P_m$ shown in FIG. 6B moves to the right side of the drawing. As a result, the pulse signal $P_{43}$ and the sampling pulse signal $P_{76}$ also move to the right side gradually. It should be noted that in such a state the sampling operation is carried out once every four fields as shown in FIGS. 6G and 6I.

As the phase of the pulse $P_m$ becomes close to that of the signal $S_m$, the pulse $P_{43}$ begins to overlap the pulse $P_{33}$, partially, as shown in FIGS. 6E and 6J. As a result, the level of the output signal from the NAND-circuit 111 becomes "0" during the overlapping interval, and thereby the transistor 112 remains non-conductive over the four field intervals because of the large time constant of a capacitor charging circuit 110T, and the collector potential of the transistor 112 is "1" regardless of the level of the output signal from the AND-circuit 102. Accordingly, since the output signals from the inverters 153 and 163 become "0", respectively, the pulse signals $P_{34}$ and $P_{43}$ which are derived through the AND-circuits 152 and 162, respectively, are not supplied to the serrated signal generator 171 and multivibrator 175. At the same time, the output signal having a level of "1" from the collector of the transistor 112 is supplied to the AND-circuits 151 and 161, respectively.

At this time, the pulse signals $P_{31}$ and $P_{41}$, which have the same phase as the pulse signals $P_{33}$ and $P_{43}$, are supplied to input terminals of a NAND-circuit 121 of a frame phase comparator 120, respectively. Thus, when the pulse signals $P_{31}$ and $P_{41}$ have the partially overlapping phase relation shown in FIGS. 6E and 6J, the output signal of the NAND-circuit 121 becomes "0" during the overlapping interval. However, the time constant of a capacitor charging circuit 120T in the frame phase comparator 120 is selected to be smaller than that of a capacitor charging circuit 110T in a color frame phase comparator 110, so that the capacitor of the capacitor charging circuit 120T is charged quickly. Therefore, even if the transistor 112 is non-conductive, a transistor 122 of the frame phase comparator 120 is still conductive, i.e., and its collector potential remains at "0".

During the color framing operation, since the input level to a buffer amplifier 103 is "1", the output level is "1", which has no affect on the operation of the transistor 122. The collector potential "0" of the transistor 122 is supplied to AND-circuits 135 and 145 to keep each of their outputs at "0". The pulse signals $P_{31}$ and $P_{41}$ are supplied to the AND-circuits 151 and 161 through OR-circuits 136 and 146, respectively. At this time, since the collector potential of the transistor 112 is "1", the pulse signals $P_{31}$ and $P_{41}$ supplied to the AND-circuits 151 and 161 pass through these AND-circuits and are applied through the OR-circuits 154 and 164 to the generator 171 and multivibrator 175, respectively. Thus, the generator 171 produces the serrated wave signal $S_{71}$ in response to the pulse signal $P_{31}$ through OR-circuit 154 at every second field, i.e., at the first and third fileds, as shown in FIG. 6K. Similarly, the multivibrator 175 produces the pulse signal $P_{75}$ in response to the pulse signal $P_{41}$ through the OR-circuit 164 at the first and third fields as shown in FIG. 6L. Thereby, the pulse signal $P_{76}$ is generated from the multivibrator 176 at every second field i.e., at the first and third fields, as shown in FIG. 6M. This means that the sampling is carried out in the sampling circuit 172 at every second field and hence the transportation speed of tape 3 is controlled at every second field. As a result, the phase of the pulse $P_m$ shifts rapidly toward being in phase with the signal $S_m$.

As the phase of the pulse $P_m$ further approaches that of the signal $S_m$, the pulse 31 begins to overlap with the pulse 41 sufficiently. As a result, the level of the output signal from the NAND-circuit 121, to which the pulses $P_{31}$ and $P_{41}$ is supplied, becomes "0" at the overlapping portion, and thereby the transistor 122 becomes nonconductive over at least two field intervals irrespective of the fact that the level of the buffer amplifier 103 is "1". Thus, the collector potential of the transistor 122 becomes the high level of "1", which is supplied to the AND-circuits 135 and 145, respectively.

Accordingly, the pulses $P_{32}$ and $P_{42}$ from the multivibrators 132 and 142 are able to pass through the AND-circuits 135 and 145 to the OR-circuits 136 and 146, respectively, so that the latter deliver pulse signals $P_{36}$ and $P_{46}$, which are equivalent to the sum of the pulses $P_{31}$ and $P_{32}$ and the sum of the pulses $P_{41}$ and $P_{42}$, respectively, as shown in FIGS. 6N and 6P. The pulses $P_{36}$ and $P_{46}$ are fed through the AND-circuits 151, 161 and the OR-circuits 154, 164 to the circuits 171 and 175, respectively. As a result, it will be noted that the signal $S_{71}$ is obtained from the generator 171 during every field as shown in FIG. 6O, and the pulses $P_{75}$ and $P_{76}$ are obtained from the multivibrators 175 and 176 during every field as shown in FIGS. 6Q and 6R, respectively.

Thus, servo control for the transporting speed of the tape 3 is performed during every field, and hence the pulses $P_m$ rapidly shifts into coincidence with the signal $S_m$.

In this case, it is apparent that the pulse $P_m$ from the control head 73 and the signal from the circuit 30 are coincident with each other in phase, and the phase relation between the subcarrier signal $S_c$ and horizontal synchronizing pulse $P_h$ in the reproduced color video signal is the same as that between the reference subcarrier signal $S_c$ and the reference horizontal synchronizing pulse $P_h$ from the generator 10. Therefore, if two VTRs, are synchronized by the same external synchronizing signal generator to make electronic editing possible, the color framing can be perfectly carried out so that no problem will occur that will cause the reproduced picture to be disturbed at the editing points.

When the VH framing is carried out, the movable arm of the switch 101 is in contact with the B-terminal thereof. This causes the level of the output signal from the AND-circuit 102 to become "0" with the result that the transistor 112 becomes non-conductive and hence its collector potential to assume the high level, i.e., the logic level "1". Thus, the pulse signals from the OR-circuits 136 and 146 are supplied through the AND-circuits 151 and 161 and further through the OR-circuits 154, 164 to the circuits 171, 175, respectively. Accordingly, in this case it is apparent that the operation described in connection with and after FIG. 6K is carried out, in other words the servo control is achieved first at every second field, or at the first and third fields, and then at every field. This means that the phase relation between the odd and even fields in the reproduced color video signal is synchronized with that in the composite synchronizing pulse $P_c$ from the generator 10.

Thus, if electronic editing is carried out under the condition that the movable arm of the switch 101 is in contact with the B-terminal thereof, the VH framing is performed.

When a field lock is achieved, the movable arm of the switch 101 is placed in contact with the C-terminal of the switch. Then, the level of the output signal from the AND-circuit 102 becomes "0". so that the collector level of the transistor 112 becomes "1", and further, the level of the output signal from the amplifier 103 becomes "0", so that the collector level of the transistor 122 becomes "1". Accordingly, the pulses $P_{32}$ and $P_{42}$ pass through the AND-circuits 135 and 145 and are fed to the OR-circuits 136 and 146, so that the pulses $P_{36}$ and $P_{46}$ are derived from the OR-circuits 136 and 146 and then fed through the AND-circuits 151, 161 and the OR-circuits 154 and 164 to the circuits 171 and 175, respectively. Thus, in this case as described in connection with and after FIG. 6N the servo control for the transporting speed of the tape is carried out at every field, so that the reproduced color video signal is in sychronism with the composite synchronizing signal $P_c$ from the generator 10 at every field. Therefore, if electronic editing is achieved under such a state, an editing per field only can be performed.

Further, though the apparatus according to this invention has been described with respect to the NTSC signal in the above embodiment, the apparatus can also be used with PAL and SECAM signals. In case of PAL signal, the phase of the color subcarrier signal with respect to the (B-Y) axis is reversed every horizontal interval, so that the periods of the color frame is four fields in that sense, as well as the NTSC signal. More specifically, in the PAL color signal, there is a frequency relationship $f_{sc} = (n + \frac{1}{4})f_h$ between the horizontal synchronizing frequency $f_h$ and the color subcarrier signal $f_{sc}$. Consequently, eight fields must occur before the phase of the color subcarrier signal exactly repeats. However, if four fields lock-up of the PAL signal is performed in the apparatus of this invention, it is at least possible to correct the inversion of the color subcarrier signal. As a matter of fact, the four field lock-up is a sufficient correction for the PAL signal. In order to determine the first field of the PAL signal, it is detected whether the burst signal exists in sixth horizontal interval of the odd field. The detected output is supplied to the input of the AND circuit 33 instead of the signal $S_e$.

In case of SECAM signal, the (R-Y) and (B-Y) color signals are transferred line-sequentially and are frequency-modulated with different carrier signals, so that the repetition of the SECAM color frame is also four fields. The carrier frequency in the seventh horizontal interval of the odd field is detected in order to determine the first field of the SECAM signal. Thus, the detected output is supplied to the input of the AND circuit 33 instead of the signal $S_e$, as in the case of the PAL signal.

What is claimed is:

1. Recording apparatus for color video signal including field and line frequency synchronizing signals and a color subcarrier signal, said apparatus comprising:
    means for generating a first signal having a frequency commensurate with the field frequency of said color video signal;
    means for generating a second signal indicating a field interval in which there is a predetermined phase relationship between the line synchronizing signals and the color subcarrier signal;
    means for combining said second signal with said first signal to produce a composite control signal; and
    means for recording said composite control signal on a recording medium.

2. Apparatus according to claim 1 in which said first signal generating means comprises a flip-flop circuit triggered by the field synchronizing signals for producing said first signal which changes from a first value to a second value during alternate fields and from said second value to said first value during the remaining alternate fields.

3. Apparatus according to claim 1 in which said second signal generating means comprises:
    means to compare said line synchronizing signals with said color subcarrier signal to obtain a field discriminating signal that is reversed at every odd field;
    means for comparing signals having the frequency of said line synchronizing signals with signals having the frequency of said field synchronizing signals to obtain a field pulse signal during every odd field; and
    means for comparing said field discriminating signal with said field pulse signal to produce said second signal once during every four fields.

4. In apparatus for reproducing a composite control signal recorded on a moving recording medium, said apparatus comprising playback means to reproduce said composite control signal and means to effect controlled relative movement between said playback means and said medium, said recorded signals comprising field and line synchronizing signals and a color subcarrier signal having predetermined phase relationships with respect to said line synchronizing signals and to said field synchronizing signals, said phase relationships being at least substantially repeated once every four fields, said recorded signals further including a signal indicative of each specific field in which said phase relationships have a certain value in each series of four of said fields;
    means for producing a reference control including field and line frequency synchronizing signal components, a color subcarrier signal component, another component signal having a frequency commensurate with said field frequency and a further component signal indicating each of said fields of said reference control signal in which said certain value of phase relationships between said color subcarrier component and said field and line synchronizing signal components exists;
    comparison means for comparing the reproduced composite control signal with said reference control signal; and control means connected to said comparison means for controlling movement of said recording medium in response to a control output signal of said comparison means.

5. Apparatus according to claim 4 in which said comparison means comprises:
   first selective means connected to said playback means to receive said composite control signal therefrom for generating a color frame signal once every four fields and a first related signal during alternate fields;
   second selective means connected to said reference control signal producing means to generate a reference color frame signal once every four fields and a second related signal during alternate fields;
   phase responsive means to respond to the phase difference between signals generated by said first and second selective means;
   gating means connecting said first and second selective means to said phase responsive means; and
   detecting means connected to said first and second selective means to respond to the phase difference between said color frame signal and said reference color frame signal, said detecting means being connected also to said gating means to gate said color frame signal and said reference color frame signal to said phase responsive means when the difference in phase therebetween is greater than a predetermined value and to gate said first and second related signals to said phase responsive means when the difference in phase between said color frame signal and said reference color frame signal is less than said predetermined value.

6. Apparatus according to claim 5 comparising control means connected to said detecting means to control the operation thereof to cause said gating means to transmit said first and second related signals to said phase responsive means during alternate fields.

7. Apparatus according to claim 5 in which said first and second selective means generate third and fourth related signals, respectively, each of said third and fourth related signals including signal components during field in which said first and second related signals do not include components, said apparatus comprising:
   second gating means connected to said first and second selective means to receive said first, second, third and fourth related signals therefrom; and
   second detecting means connected to said first and second selective means to respond to the certain of the signals generated thereby and connected to said second gating means to control the operation thereof to transmit said first and second related signals through said second gating means when the phase difference between said certain of said signals is greater than a predetermined value and to transmit said first, second, third and fourth signals through said second gating means to said first-named gating means when the phase difference between said certain of said signals is less than said predetermined value.

* * * * *